UNITED STATES PATENT OFFICE.

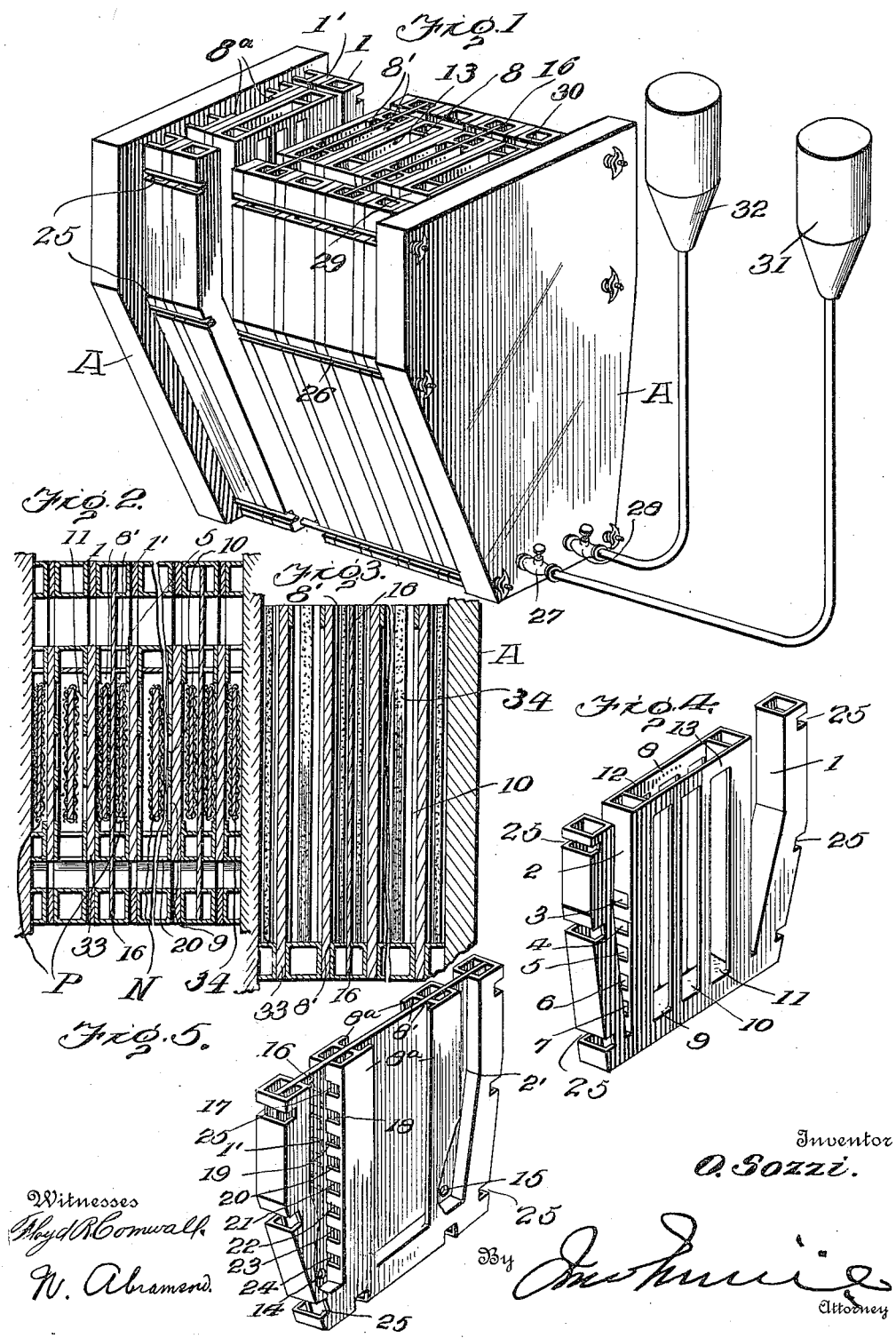

OLIVIO SOZZI, OF NAPLES, ITALY.

CHEMICAL GENERATOR OF ELECTRICITY.

1,069,493.   Specification of Letters Patent.   Patented Aug. 5, 1913.

Application filed September 9, 1912.   Serial No. 719,455.

*To all whom it may concern:*

Be it known that I, OLIVIO SOZZI, a subject of the King of Italy, and residing at 48 Via G. Filangieri, Naples, Italy, have invented certain new and useful Improvements in Chemical Generators of Electricity, of which the following is a specification, reference being had therein to the accompanying drawing.

The present invention refers to a chemical generator of electricity which consists of a number of primary cells designed and arranged so as to form, when combined, a generator which, in comparison with the ordinary devices of this kind, is thereby characterized, (1) that no outer jar and none of the ordinary porous cells are employed, (2) that the electrodes and the cells may readily be removed and changed, notwithstanding the fact that the electrodes are arranged very tightly within the cells and that the cells themselves are placed very close together and are almost in contact, by which arrangement the advantages mentioned below under 3 and 4 are obtained, (3) that the size and weight of the complete generator are very small in proportion to the amount of energy which may be obtained, (4) that the internal resistance is insignificant and consequently, under otherwise equal conditions, the efficiency very much higher, the latter being inversely proportional to the former according to the well-known electrochemical formula $$\text{efficiency} = 1 - \frac{r}{y}J,$$

where $r$ is the internal resistance, $y$ the electromotive force of the generator and $J$ the strength of the current, (5) that the by-products of the negative electrode can in no way prevent either the chemical reaction or the generation of current, and that these by-products may at any moment be removed from the generator, without the action of the same being in any way interfered with, (6) that, unlike the cells at present in use, the generator, on account of slightly porous diaphragms being used, may almost continually remain charged on open circuit, even if the liquids are not removed from the electrodes, (7) that the chemical reaction and consequently the action of the cell may be interrupted, not by removing the electrodes, as it is necessary in the cells of known design, but by removing the liquid by means of a special and quite simple device, which allows the generator to be instantaneously put into or out of action, even when it consists of a large number of cells, and finally, (8) that the special arrangement of the crystals of the saturating salt (in the case here considered, of copper sulfate) insures a direct saturation of the whole mass of the liquid, so that currents between more and less dense liquids and a consequent increase of internal resistance are completely avoided.

The form of construction here described is a generator in the dimensions of 14x17x16 inches, having zinc and copper as electrodes, with copper sulfate and a solution of sodium chlorid as exciting liquid and with the chemical reaction of a Daniell cell, but it is evident that the choice of the electrodes and the liquids may be infinitely varied according to the purpose to be obtained in accordance with their special qualities, while the above mentioned advantages will be obtained whichever be the reaction chosen for producing the electromotive energy.

In the annexed drawings Figure 1 is a perspective partly broke away and shows the device assembled. Fig. 2 is a horizontal section partly broken away taken through the upper part of Fig. 1. Fig. 3 is a vertical section also broken away. Fig. 4 shows one of the electrode frames the position being reversed from it shown in Fig. 1. Fig. 5 is a perspective of the remaining style of electrode frame partly broken away to show certain openings.

The frame for the negative plate N (Fig. 4) which is in the shape of a lyre, is made of cardboard or other suitable material and comprises a chamber 1 to receive the crystals of copper sulfate, in case, of course, the Daniell reaction is made use of, and a chamber 2 for the inlet and outlet of the exciting solution consisting in this case of water and sodium chlorid, the said chamber 2 being provided with a number of holes 3, 4, 5, 6, 7 to permit the exciting liquid to reach the negative plate arranged in the compartment 8. This compartment is confined by two frames 12 and 13 provided with large openings 9, 10, 11 and capable of preventing contact between the negative plate and the porous diaphragms.

The frame for the positive plate P (Fig. 5) is similar to the frame for the negative plate, but differs from it by being divided into two compartments by means of a diaphragm 16 of cardboard or other non-porous material. The diaphragm is provided with holes 14 and 15 which connect the said two compartments. This frame for the positive plate is not provided with frames such as 12 and 13 in the frame for the negative plate, and the holes for the passage of the liquid to the plates are arranged in 17, 18, 19, 20, 21, 22, 23, 24 on the side of the chamber 1' which serves, like the corresponding chamber 1 of the frame for the negative plate, to receive the crystals and the solution of copper sulfate, which latter has thus access to the two positive plates arranged in the compartment 8', one on each side of the diaphragm 16.

The chamber 2' corresponds to the chamber 2 of the frame for the negative plates and receives like the said chamber 2 the exciting liquid.

The compartments 8 and 8' are designed as shown in Figs. 4 and 5, and they have a lateral guide 8ª for introducing the electrodes and keeping them in place so that they should not contact with a diaphragm 33 (Fig. 3) which is interposed between the single frames, as will hereafter be explained.

The frames are provided on the outside with grooves 25 (Figs. 4 and 5) adapted to receive the stems of bolts 26 which serve to draw the frames close together when the battery is set up.

To erect a battery of a certain number of cells, a corresponding number of frames are arranged in succession so as to be in contact with each other and so that each frame for a negative plate is followed by a frame for a positive plate, one or more diaphragms 33 (Fig. 3) of parchment or other more or less porous material being placed between each two frames. Against the first and last frames of the battery is placed an end plate A of wood or other suitable material, and the whole is kept closely together by means of the bolts 26. One of the two end plates carries two cocks 27 and 28, which are in communication with one or the other of the two channels 29 and 30 formed respectively by the successive chambers 1, 1', 2, 2', as is shown in Fig. 1, where the channel 29 is formed by the chambers 1, 1' and the channel 30 by the chambers 2, 2'. It should be borne in mind that the holes 14 and 15 in the diaphragms 16 of the frames for the positive plates establish the continuity of the channels 29 and 30, which otherwise would be broken by the said diaphragms. The cocks 27 and 28 are connected with two flexible tubes which are communicating with two vessels 31 and 32 (Fig. 1).

In order to remove the liquids from the electrodes and thus put the battery out of action, the two vessels need only be lowered below the bottom of the two channels 29 and 30, so that the liquids are caused to flow into the vessels and leave the cells dry. To put the battery in action, it is sufficient to raise the two vessels and allow the liquid to flow back into the channels into contact with the electrodes.

The negative plate N is preferably of zinc and these plates are held in the compartment 8 while the positive plates P are preferably of copper and are held in the compartment 8'.

The zinc plates, arranged in the respective compartments 8 of the respective frames, are placed into small bags 34 of linen or other suitable material, so that the by-products which are formed on the plates being acted on by the exciting liquid, will be retained in the said bags and that the positive plates may be easily cleaned and changed and the by-products which can thus in no way affect the action of the battery, be readily removed. The described method of arranging the zinc plates in linen bags and of providing frames with large holes 9, 10, 11, also prevents a deposit of electrolytic copper on the surface of the diaphragm toward the copper, in case the diaphragm should on the opposite side come into contact with the negative plate or particles of the by-products of the zinc in some way be deposited on the surface of the diaphragm toward the said plate.

It is well known that one of the most serious inconveniences in electrical cells consists in that metallic particles are deposited on the porous receptacles which in consequence have frequently to be changed. With the described method, such deposit is rendered impossible and thereby an important economical advantage obtained in that the expense for changing these porous receptacles is avoided, the same being replaced, as has been described, by cheap diaphragms of parchment, on which in no case, on account of the method here employed, a metallic deposit may be formed.

What is claimed is:

1. In a battery of the class described, a cell section arranged to support an electrode, said section consisting of a frame of fibrous material provided with a bottom member, upright channel shaped members extending from said bottom member and forming a support for an electrode, one of said upright members being perforated to permit the passing of an electrolyte, upright members extending from said base member and having its upper ends in spaced relation to the first upright member.

2. In a battery of the class described, a cell section arranged to support an electrode, said section consisting of a frame of fibrous material provided with a bottom member, upright channel shaped members extending from said bottom member and forming a support for an electrode, one of said upright members being perforated to permit the passing of an electrolyte, upright members extending from said base member and having its upper ends in spaced relation to the first upright member and a partition extending between the last mentioned upright members and through the space between the first mentioned upright members, said part being provided with openings through the lower part thereof.

3. A battery of the class described comprising a cellular member having a central portion provided with slotted sides and having one edge provided with openings to afford communication between the central portion and the space exterior thereof, said member further having edge portions spaced laterally from the edges of the central portion, and forming receptacles for an electrolyte, a second member having a centrally-disposed partition and lateral edge portions corresponding to the edge portions of the first member, said second member further having guides disposed in spaced relation to the edge portions, one of said guides having perforations therein to afford communication between the space intermediate said guides and the perforated guide and edge portion, said central partition having openings between the guides and the edge portions, a porous diaphragm held between said guides and the central portion of the first member, an electrode held in the central portion of the first member, a second electrode held between said guides, and means to close the outer sides of said members and clamp the same together.

In witness whereof, I, the said OLIVIO SOZZI, have signed this specification at Naples in the Kingdom of Italy this 27th day of August 1912.

OLIVIO SOZZI.

In the presence of two witnesses:
IRWIN VON COBSTEIN,
GIUSEPPE CONSIGLIO.

---

Copies of this patent may be obtained for five cents each, by addressing the "Commissioner of Patents, Washington, D. C."